United States Patent [19]
Moore, Jr.

[11] 3,829,131
[45] Aug. 13, 1974

[54] AIRCRAFT TOW BAR

[75] Inventor: George E. Moore, Jr., San Angelo, Tex.

[73] Assignee: Jewel B. Moore, San Angelo, Tex.

[22] Filed: Mar. 7, 1973

[21] Appl. No.: 338,825

[52] U.S. Cl............ 280/493, 280/491 R, 180/14 C
[51] Int. Cl............................................... B60d 1/14
[58] Field of Search........ 280/503, 493, 491 R, 494, 280/460 R; 180/14 C; 294/19 R

[56] References Cited
UNITED STATES PATENTS

| | | | |
|---|---|---|---|
| 1,836,806 | 12/1931 | Larsen | 280/491 R |
| 2,057,655 | 10/1936 | Anthony et al. | 280/460 R |
| 2,252,691 | 8/1941 | Arndt | 280/460 R |
| 2,468,669 | 4/1949 | Holmes | 180/14 C UX |
| 3,709,522 | 1/1973 | Olson | 180/14 C X |

Primary Examiner—Leo Friaglia
Attorney, Agent, or Firm—Clarence A. O'Brien; Harvey B. Jacobson

[57] ABSTRACT

An elongated tension bar including front and rear end portions pivotally joined together for relative oscillation about a transverse axis. The front end of the bar includes a ring for attachment to a towing vehicle and the rear end of the bar includes a bifurcated end portion whose furcations have generally semi-cylindrical downwardly opening notches formed therein for engagement over the axle ends of the nose wheel of an aircraft. Latch structure is provided for partially closing the lower portions of the axle end receiving notches and thereby locking the bifurcated end to the associated nose wheel axle. Also, the latch means includes a locking structure for locking the latch means of the tow bar in the operative position and also serving, when desired, to maintain the tow bar in a folded compact position for portability and compact storage on an associated aircraft.

7 Claims, 8 Drawing Figures

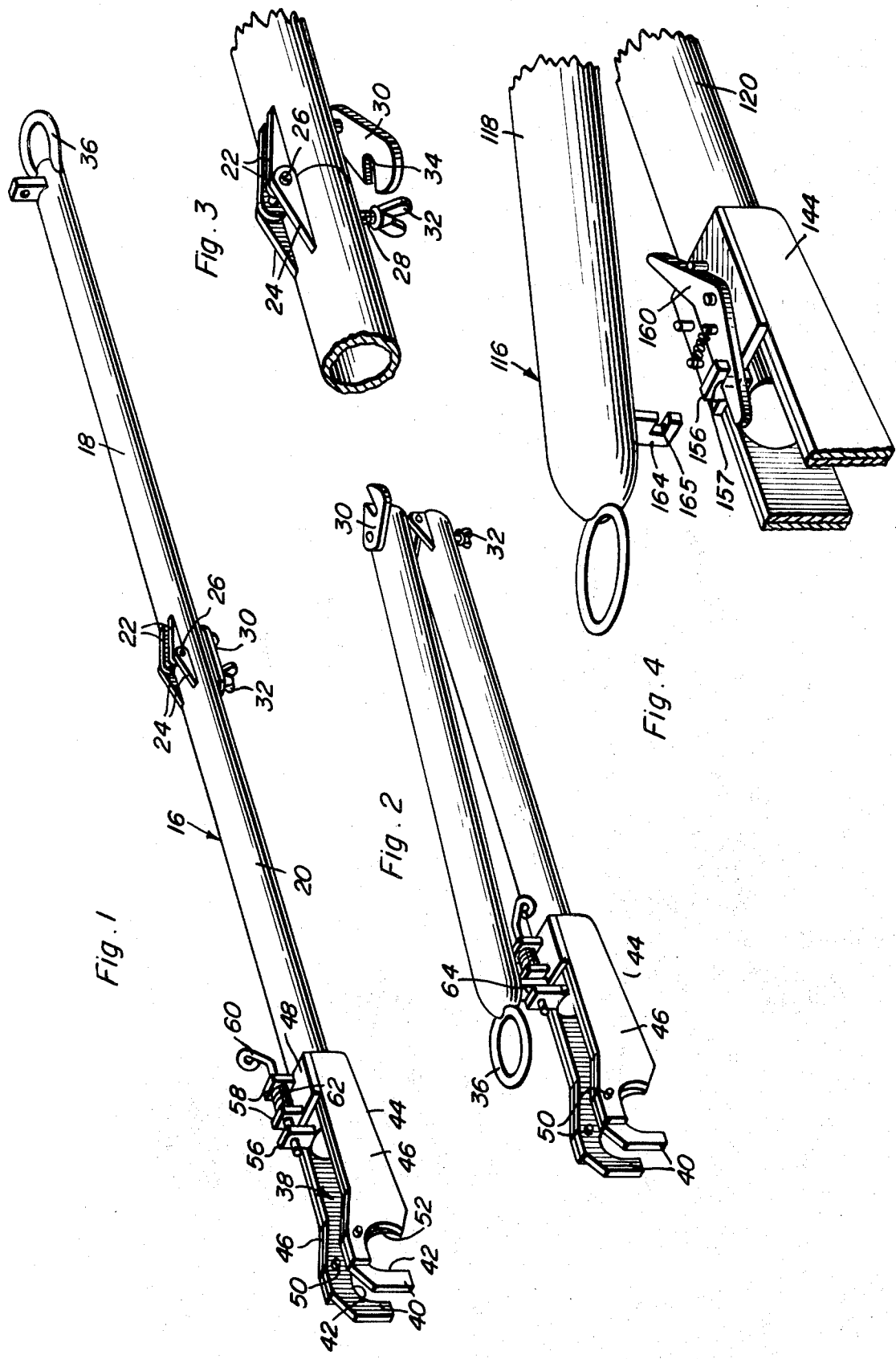

AIRCRAFT TOW BAR

The tow bar of the instant invention has been designed to provide a menas whereby a draft vehicle may be readily attached to the nose wheel of an aircraft. Aircraft nose wheels conventionally are journaled from horizontal axle members including exposed opposite end portions and the rear end of the tow bar is equipped with means for ready releasable engagement with the ends of the nose wheel axle while the front end of the tow bar is provided with an anchor ring for securement to the draft vehicle.

Heretofore aircraft tow bars such as those disclosed in U.S. Pats. Nos. 2,391,608 and 3,331,619 have included reasonably complex structure requiring more than minimal machining in order to provide a device which may be releasably secured to an associated aircraft nose wheel assembly.

Accordingly, it is the main object of this invention to provide an aircraft tow bar whose rear end is provided with structure requiring a minimum of machining to manufacture and which may be readily releasably anchored to the opposite end portions of a nose wheel axle in a manner such that angular displacement of the tow bar about an upstanding axis will cause similar angular displacement of the associated aircraft nose wheel.

Another object of this invention, in accordance with the immediately preceding object, is to provide an aircraft tow bar which may be readily folded and stored in a compact state as well as rendered readily portable.

A final object of this invention to be specifically enumerated herein is to provide an aircraft tow bar in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a perspective view of the tow bar of the instant invention in an unfolded condition;

FIG. 2 is a perspective view of the tow bar in a folded condition;

FIG. 3 is a fragmentary perspective view of the pivotal joint between the front and rear end portions of the tow bar;

FIG. 4 is a fragmentary perspective view illustrating the manner in which the front and rear end portions of the tow bar may be positioned immediately prior to securement of the tow bar in a folded condition;

Figure 5:
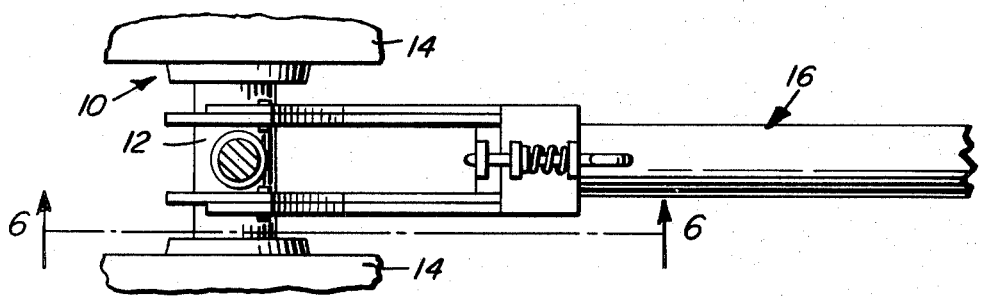
FIG. 5 is a fragmentary horizontal sectional view of a conventional form of double wheel aircraft nose wheel assembly and with the rear end portion of the tow bar of the instant invention operatively secured to the opposite end portions of the axle of the nose wheel assembly.

Referring now more specifically to the drawings the numeral 10 generally designates a conventional form of aircraft nose wheel assembly, see FIG. 5, including a horizontal axle 12 having a pair of wheels 14 journaled on its opposite ends.

The tow bar of the instant invention is referred to in general by the reference numeral 16 and comprises front and rear end portions 18 and 20 disposed in end aligned relation. The front end portion 18 includes a pair of transversely spaced apertured mounting ears 22 and the rear end portion 16 includes a pair of transversely spaced apertured mounting ears 24. The mounting ears 22 and 24 project rearwardly and forwardly, respectively, of the rear and front ends of the front and rear end portions 18 and 20 and are disposed in overlapped relation. A pivot pin 26 is passed through the apertured mounting ears 22 and 24 and thereby pivotally secures the front and rear end portions 18 and 20 together for relative angular displacement between the extended operative positions thereof illustrated in FIG. 1 of the drawings and the relatively folded positions illustrated in FIG. 2 of the drawings.

A depending threaded stud 28 is carried by the forward end of the rear end portion 20 and a notched latching lever 30 is pivotally supported from the rear end of the forward end portion 18. When the end portions 18 and 20 are in the end aligned operative positions illustrated in FIG. 1 of the drawings, the notched latching lever 30 may be swung from the position thereof illustrated in FIG. 3 of the drawings to the operative position thereof illustrated in FIG. 1 and a thumb nut 32 may be threadedly engaged with the stud or shank 28, the latter being received in the notch 34 formed in the lever 30. In this manner, the front and rear end portions 18 and 20 may be secured against angular displacement about the pivot pin 26.

Figure 6:
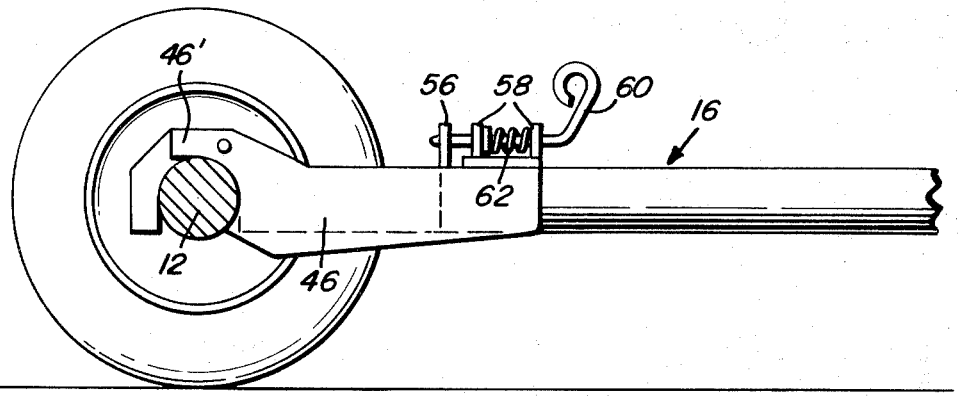
FIG. 6 is a fragmentary vertical sectional view taken substantially upon the plane indicated by the section line 6—6 of FIG. 5.
Figure 7:
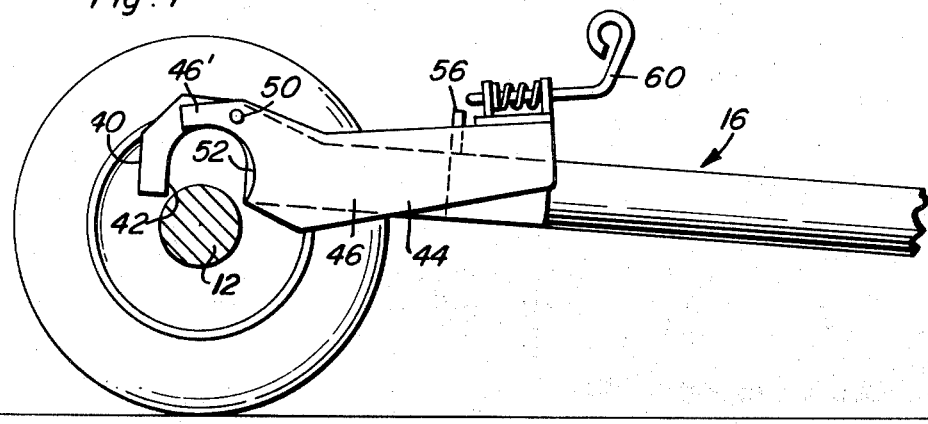
FIG. 7 is a vertical sectional view similar to FIG. 6 but with the rear end portion of the tow bar in position immediately prior to securement of the tow bar to the nose wheel assembly axle.
Figure 8:
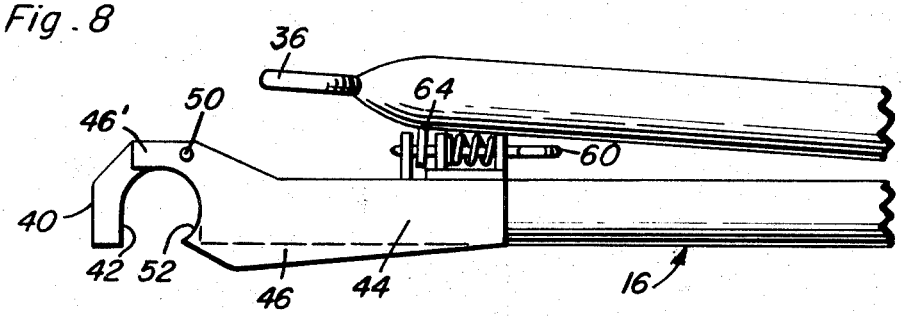
FIG. 8 is a fragmentary side elevational view of the tow bar illustrated in FIGS. 1 and 2 of the drawings with the front and rear ends thereof locked in the folded position.

The front end of the forward end portion 18 includes an anchor eye 36 for attachment to a draft vehicle and the rear end of the rear end portion 20 includes a bifurcated mount referred to in general by the reference numeral 38 and including rearwardly directed furcations 40 having downwardly opening generally inverted U-shaped notches 42 formed therein. As may best be seen from FIGS. 5 through 7 of the drawings, the notched furcations 40 may be received between the wheels 14 and downwardly engaged over the opposite end portions of the axle member 12. In addition, a U-shaped latch 44 including a pair of parallel side plates 46 interconnected at their forward ends by means of an upper transverse bight portion 48 is provided and the free ends of the side plates 46 remote from the bight portion 48 are pivoted as at 50 to the furcations 40. The side plates 46 have quarter circular notches 52 formed therein and it may be seen that the latch 44 may be raised to an inoperative position such as that illustrated in FIG. 7 of the drawings to withdraw the lower rear portions of the side plates 46 out of registry with the notches 42 and enable the notched furcations 40 to be downwardly displaced over the axle member 12 in the manner illustrated in FIG. 6 of the drawings. Then, the forward end of the latch 44 may be downwardly displaced from the position thereof illustrated in FIG. 7 of the drawings to the position thereof illustrated in FIG. 6 of the drawings so that the lower rear portions of the side plates 46 will move into registry with the lower ends of the notches 42 and thereby lock the bifurcated mount 38 on the axle member 12.

An upstanding apertured lug 56 is secured to the rear end of the rear end portion 20 closely rearward of the bight portion 48 when the latch 44 is in the position thereof illustrated in FIG. 1 and a pair of apertured lugs 58 are carried by the bight portion 48 and have a spring urged lock pin 60 slidably received therethrough. The lock pin 60 may be retracted forwardly against the biasing action of the associated compression spring 62 so as to withdraw the rear end of the latch pin 60 from the lug 56 which is spaced slightly rearward of the rearmost lug 58. In addition, the forward end of the forward end portion 18 includes an apertured lug 64 which is receivable downwardly between the rearmost lug 58 and the lug 56 when the front and rear end portions 18 and 20 are in the folded positions illustrated in FIG. 2. After the lug 64 has been swung into position between the rearmost lug 58 and the lug 56, the latch pin 60 may be allowed to shift rearwardly under the biasing action of the spring 62 so as to be projected through the lug 64 as well as the lug 56 and thereby lock the end portions 18 and 20 in the folded positions illustrated in FIG. 2.

With attention now invited more specifically to FIG. 4 of the drawings, there may be seen a modified form of tow bar referred to in general by the reference numeral 116 and which is similar in many respects to the bar 16 and therefore has corresponding components thereof designated by numerals in the 100 series corresponding to the numerals designating the similar components of the bar 16.

Instead of the rear end portion 120 of the bar 116 being provided with an apertured lug corresponding to the lug 56, an anchor lug 156 is provided and includes a horizontally outwardly opening notch 157. In addition, in lieu of providing a spring-urged latch pin such as the latch pin 60, the bar 116 includes a spring-urged pivoted latch member 160 receivable in the notch 157 and also a notch 165 formed in a lug 164 corresponding to the lug 64. Of course, the pivoted latch member 160 serves not only to maintain the end portions 118 and 120 in folded positions, but also to retain the latch 144 corresponding to the latch 44 in the operative position.

With attention again invited to FIGS. 6 and 7, it may be seen that by extending the free ends of side plates 46 past the pivot axes 50 thereof, as at 46', as the latch 44 is swung from the position thereof illustrated in FIG. 6 to the release position thereof illustrated in FIG. 7 the adjacent end of the bar 16 will be cammed slightly upwardly by the portions 46', relative to the axle 12 in order to assist in subsequent full disengagement of the bar 16 from the axle 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A tow bar for airplanes, said bar comprising an elongated tension bar having a first end including first means for securement to a draft vehicle and a second end including second means for operatively removably anchoring said bar to an airplane nose wheel assembly, said second means including latch means shiftable between locked and unlocked position for latching and unlatching, respectively, said bar to said nose wheel assembly and a releasable lock shiftable between operative and inoperative position and operative, when in the operative position, to lock said latch means in the locked position, said tension bar including first and second end portions pivotally joined together at adjacent ends for relative angular displacement about a transverse axis between end aligned positions and side-by-side generally parallel relatively folded positions, the free end of said first end portion including an anchor portion, said anchor portion, when said end portions are in their folded positions, being positioned for engagement by said lock when the latter is moved to its operative position for locking said end portions against relative angular displacement.

2. The combination of claim 1 wherein said anchor portion defines a through passage generally paralleling said first end portion and said lock includes a lock pin supported from said second end for lengthwise shifting longitudinally of said second end portion between said operative and inoperative positions with said pin projecting into and withdrawn from said through passage, respectively.

3. The combination of claim 1 wherein said anchor portion defines a notch opening laterally of said first end portion, said lock including a lock lever oscillatably supported from said second end for angular displacement about an axis extending transversely of said second end between said operative and inoperative position with said lever having a portion thereof disposed within and withdrawn from said notch, respectively.

4. The combination of claim 1 wherein said second means comprises a bifurcated end portion on said second end whose furcations are spaced apart transversely of said bar in a first direction, said furcations including transversely aligned notches opening outwardly in a second direction extending transversely of said bar and disposed at generally right angles to said first direction, said notches being adapted to be engaged over axially spaced axle portions of said nose wheel assembly, said latch means comprising a bifurcated lever including parallel arms interconnected at one pair of corresponding ends by a bight portion extending therebetween, the other pair of ends of said arms being pivotally supported from said furcations and including portions projectable into the outer ends of said notches, when said latch means is in the operative position, to at least partially close the outer ends of said notches.

5. A tow bar for airplanes, said bar comprising an elongated tension bar having a first end including first means for securement to a draft vehicle and a second end including second means for operatively removably anchoring said bar to an airplane nose wheel assembly, said second means including latch means shiftable between locked and unlocked position for latching and unlatching, respectively, said bar to said nose wheel assembly and a releasable lock shiftable between operative and inoperative position and operative, when in the operative position, to lock said latch means in the locked position, said second means comprising a bifurcated end portion on said second end whose furcations are spaced apart transversely of said bar in a first direction, said furcations including transversely aligned notches opening outwardly in a second direction extending transversely of said bar and disposed at generally right angles to said first direction, said notches being adapted to be engaged over axially spaced axle portions of said nose wheel assembly, said latch means comprising a bifurcated lever including parallel arms interconnected at one pair of corresponding ends by a bight portion extending therebetween, the other pair of ends of said arms being pivotally supported from said furcations and including portions projectable into the outer ends of said notches, when said latch means is in the operative position, to at least partially close the outer ends of said notches, said tension bar including first and second end portions pivotally joined together at adjacent ends for relative angular displacement about a transverse axis between end aligned operative positions and side-by-side generally parallel relatively folded inoperative positions, the free end of said first end portion including an anchor portion, said anchor portion, when said end portions are in their folded positions, being positioned for engagement by said lock when the latter is moved to its operative position for locking said end portions against relative angular displacement from said folded positions toward said end aligned operative positions.

6. A tow bar for airplanes, said bar comprising an elongated tension bar having a first end including first means for securement to a draft vehicle and a second end including second means for operatively removably anchoring said bar to an airplane nose wheel assembly, said second means including latch means shiftable between locked and unlocked position for latching and unlatching, respectively, said bar to said nose wheel assembly and a releasable lock shiftable between operative and inoperative position and operative, when in the operative position, to lock said latch means in the locked position, said second means comprising a bifurcated end portion on said second end whose furcations are spaced apart transversely of said bar in a first direction, said furcations including transversely aligned notches opening outwardly in a second direction extending transversely of said bar and disposed at generally right angles to said first direction, said notches being adapted to be engaged over axially spaced axle portions of said nose wheel assembly, said latch means comprising a bifurcated lever including parallel arms interconnected at one pair of corresponding ends by a bight portion extending therebetween, the other pair of ends of said arms being pivotally supported from said furcations and including portions projectable into the outer ends of said notches, when said latch means is in the operative position, to at least partially close the outer ends of said notches, said anchor portion defining a through passage generally paralleling said first end portion and said lock including a lock pin supported from said second end for lengthwise shifting longitudinally of said second end portion between said operative and inoperative positions of said lock with said pin projecting into and withdrawn from said through passage, respectively.

7. A tow bar comprising an elongated tension bar having a first end including first means for securement to a draft vehicle and a second end including second means for operatively removably ancoring to a towed vehicle, said second means including latch means shiftable between locked and unlocked position for latching and unlatching, respectively, said bar to said towed vehicle and a releasable lock shiftable between operative and inoperative position and operative, when in the operative position, to lock said latch means in the locked position, said tension bar including first and second end portions pivotally joined together at adjacent ends for relative angular displacement about a transverse axis between end aligned positions and side-by-side generally parallel relatively folded positions, the free end of said first end portion including an anchor portion, said anchor portion, when said end portions are in their folded positions, being positioned for engagement by said lock when the latter is moved to its operative position for locking said end portions against relative angular displacement from said folded positions toward said end aligned positions.

* * * * *